(12) United States Patent
Burg

(10) Patent No.: US 6,460,485 B1
(45) Date of Patent: Oct. 8, 2002

(54) COLLAPSIBLE HOUSE FOR BIRDS, ETC.

(76) Inventor: Jerry A. Burg, 260 E. 2d Ave., Eugene, OR (US) 97401

( * ) Notice: Subject to any disclaimer, the term of this patent is extended or adjusted under 35 U.S.C. 154(b) by 0 days.

(21) Appl. No.: 10/056,933

(22) Filed: Jan. 25, 2002

(51) Int. Cl.[7] ............................................. A01K 31/00
(52) U.S. Cl. ........................ 119/431; 119/491; 119/498
(58) Field of Search ................. 119/431, 461, 119/474, 491, 498, 513; D30/108

(56) References Cited

U.S. PATENT DOCUMENTS

| | | | |
|---|---|---|---|
| 2,445,055 A | | 7/1948 | Capaul |
| 4,021,960 A | * | 5/1977 | Walmer ........................ 446/104 |
| 4,467,572 A | | 8/1984 | Somers et al. |
| 4,569,664 A | * | 2/1986 | Giampetruzzi et al. ..... 446/110 |
| 4,903,637 A | | 2/1990 | Devault |
| 5,007,569 A | * | 4/1991 | Zarb ........................... 220/505 |
| 5,115,762 A | | 5/1992 | Long |
| 5,479,877 A | | 1/1996 | Demboske |
| 5,613,466 A | * | 3/1997 | Mennemeyer ............... 119/431 |
| 4,109,427 A | | 8/1998 | O'Brian et al. |
| 5,950,568 A | | 9/1999 | Axelrod et al. |
| 6,397,781 B1 | * | 6/2002 | Bellington .................. 119/431 |

* cited by examiner

Primary Examiner—Yvonne R. Abbott
(74) Attorney, Agent, or Firm—Robert E. Howard

(57) ABSTRACT

A collapsible house that can be easily erected from a compact package. The house has opposing sidewalls, opposing endwalls, a floor and roof sections. The endwalls are collapsible down against the floor. The roof sections are collapsible down against the sidewalls, and the combination of the roof sections collapsed against the sidewalls are further collapsible down against the collapsed endwalls.

5 Claims, 6 Drawing Sheets

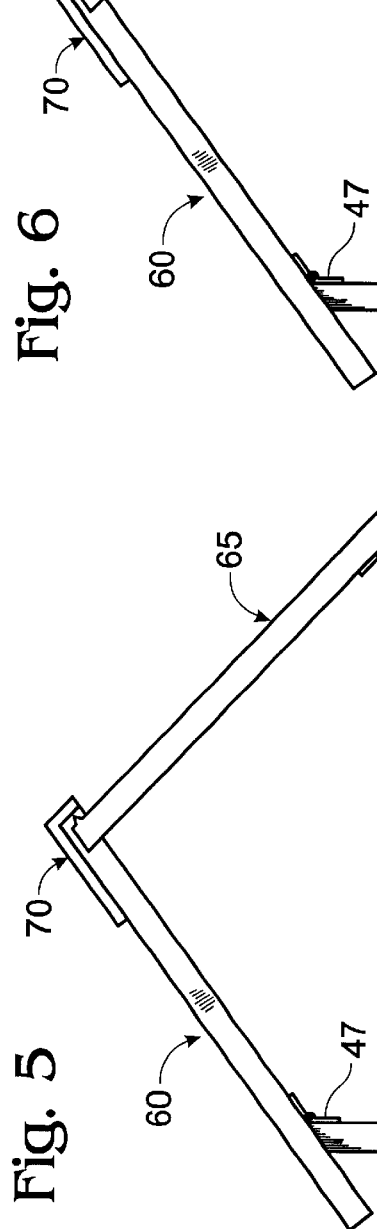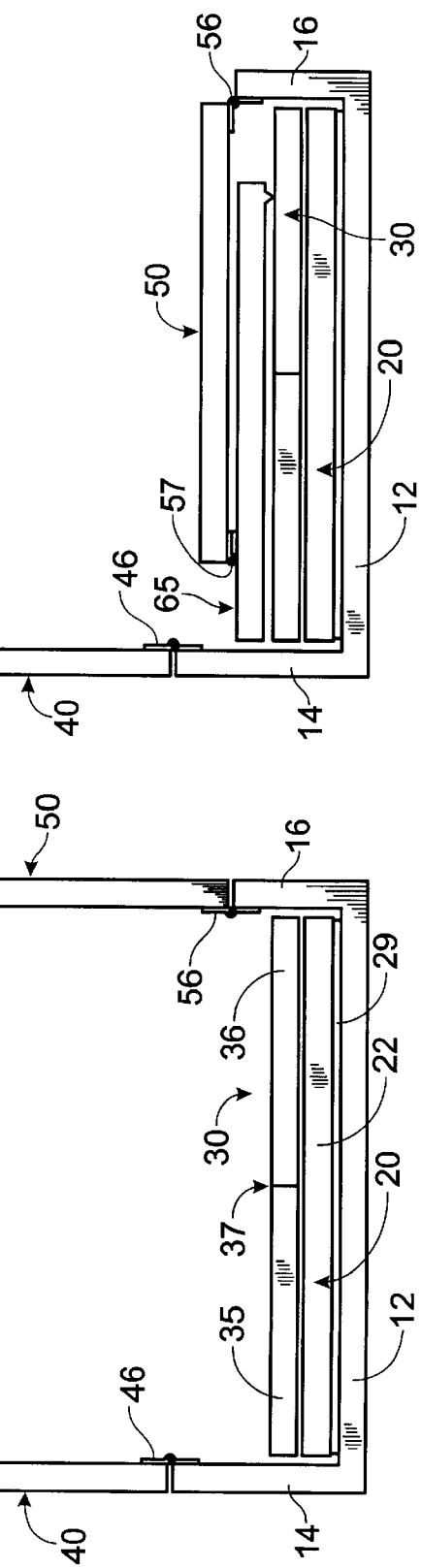

COLLAPSIBLE HOUSE FOR BIRDS, ETC.

BACKGROUND OF THE INVENTION

The present invention relates to a house or shelter for birds, dogs, etc. ("occupant"), which can be collapsed into a compact package for shipping or storage, and easily erected from its collapsed configuration into the house.

The prior art is replete with various approaches to collapsible houses or shelters for animals.

U.S. Pat. No. 2,445,055 describes a collapsible dog house having a floor, peaked end panels connected to the floor by hinges, side walls having lower edges which are in interlocking engagement with the floor, the upper portions of the side walls being coupled to end panels by hook and eye connectors, and roofing boards connected by hinges which are dropped into position upon the peaked faces of the end panels.

U.S. Pat. No. 4,109,427 describes a foldable structure useful as a dog house that includes parallel side walls connected by hinges to top members, the top members being connected by a hinge to each other, end walls connected to side walls by hinges, and a bottom extending between the side walls that is connected to one of the side walls by hinges.

U.S. Pat. No. 4,467,572 describes a collapsible doghouse that-includes a base, front and rear walls, opposing sidewalls and a roof positionable over the walls.

U.S. Pat. No. 4,903,637 describes a foldable house and carrier for small pets that includes hingeably interconnected floor, side walls and a roof.

U.S. Pat. 5,115,762 describes a prefabricated doghouse that includes seven prefabrication sections that are assembled by sliding them together and interlocking the sections with a plurality of slip pin fasteners and hasp fasteners.

U.S. Pat. 5,950,568 describes a foldable/collapsible animal shelter. The structure includes two sidewalls, each having an upper, middle and lower section. The sidewalls contain a pivot on each of the outer and inner surfaces in order that upper and middle sidewall sections collapse inwardly towards a bottom. The upper sidewalls are pivotally attached to two roof sections. A front wall and a rear wall are pivotally attached to the bottom. The roof is comprised of two roof sections pivotally attached to one another, the roof sections being collapsible downwardly along the pivotal attachment toward the bottom.

SUMMARY OF THE PRESENT INVENTION

The present invention relates to a collapsible house for creatures, such as dogs, birds, etc., that can be easily erected from a compact package. The house has opposing sidewalls, opposing endwalls, a floor and roof sections. The endwalls are collapsible down against the floor. The roof sections are collapsible down against the sidewalls, and the combination of the roof sections collapsed against the sidewalls are further collapsible down against the collapsed endwalls.

BRIEF DESCRIPTION OF THE DRAWINGS

FIG. 5 is a front elevation view of the house of the present invention with the front and rear walls collapsed onto the floor;

FIG. 6 is a front elevation view of the house of the present invention with the left wall/roof collapsed onto the rear wall;

DESCRIPTION OF PREFERRED EMBODIMENTS

The house 10 of the present invention has a floor 12 having upwardly extending right and left sidewall foundation flanges 14 and 16, respectively.

Herein, directions such as right, left, front, rear, upper and lower are related to a theoretical viewer located inside the house standing on the floor and facing the front wall 20.

Figure 1:
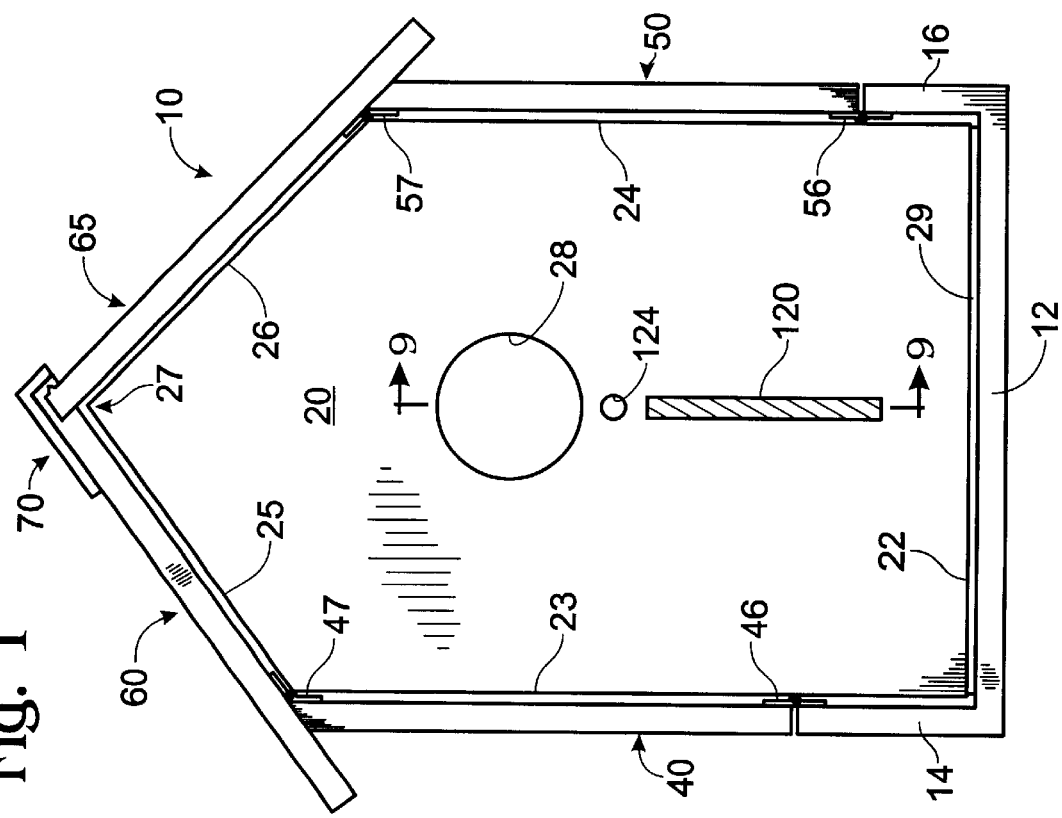
FIG. 1 is a front elevation view of the house of the present invention.

As best seen in FIG. 1, front endwall 20 includes a bottom edge 22, vertical right and left side edges 23 and 24, respectively, and a pair of right and left sloping upper edges 25 and 26, respectively. Sloping upper edges 25 and 26 meet at an apex 27 and form a gable. The bottom edge 22 of front wall 20 is attached to the adjacent front portion of floor 12 by a hinge member 29 in a manner adapted to allow front wall 20 to be pivoted backwards and downwards into the interior of house 10, as shown in FIG. 5

An entry opening 28 is provided in front wall 20 for ingress and egress of a creature. Where the house 10 is to be used as a birdhouse, opening 28 is a circular entrance/exit opening, as shown. Optionally, a perch 120, which can be formed from a piece of dowel stock, is held in place in groove 122 located in the surface of front wall 20. During assembly of house 10, perch 120 may be removed from groove 122 and inserted into perch opening 124 located just below entrance/exit opening 28 to form a perch for a bird.

Where the house 10 is to used as a doghouse, a typical doghouse entrance/exit opening (not shown) extending from floor 12 to a mid-portion of front wall 20 would be provided in place of circular opening 28.

Figure 2:
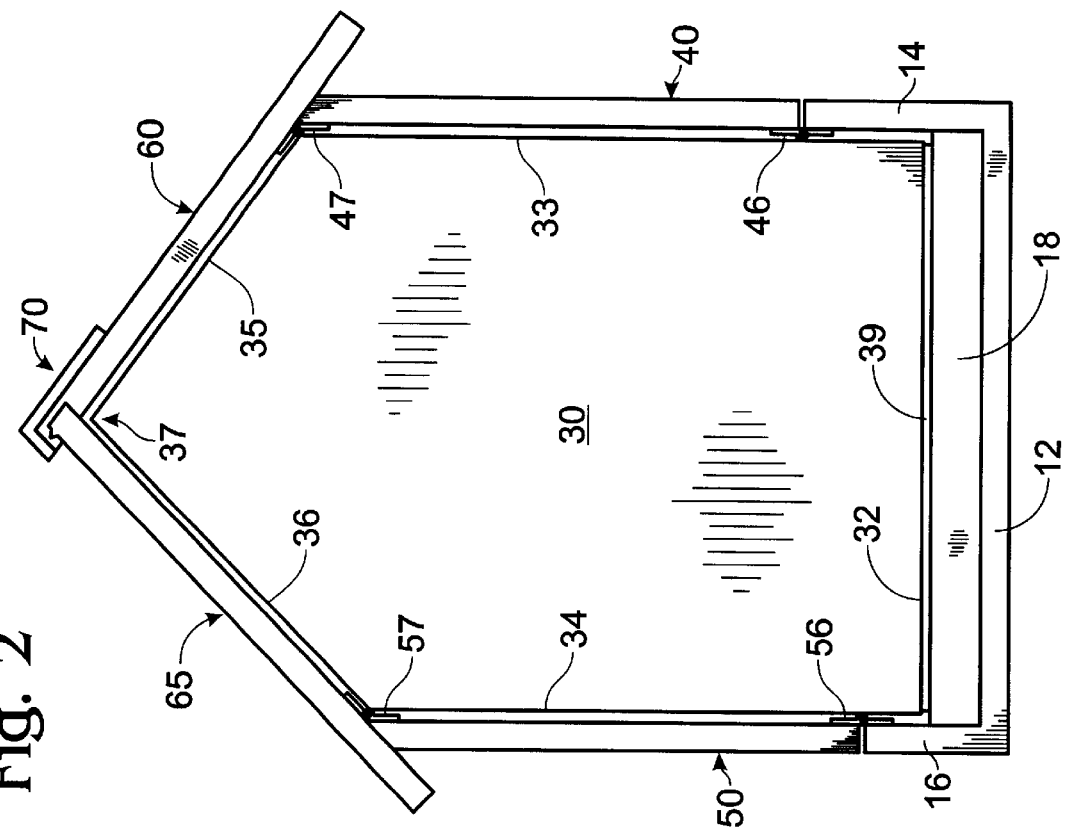
FIG. 2 is a rear elevation view of the house of the present invention.

As best seen in FIG. 2, rear endwall 30 includes a bottom edge 32, vertical right and left side edges 33 and 34, respectively, and a pair of right and left sloping upper edges 35 and 36, respectively. Sloping upper edges 35 and 36 meet at an apex 37 and form a gable. The bottom edge 32 of rear wall 30 is attached to a rear flange 18 extending upwardly from the adjacent rear portion of floor 12 by a hinge member 39 in a manner adapted to allow front wall 20 to be pivoted backwards and downwards into the interior of house 10 and on top of front wall 20, as best seen in FIG. 5.

House 10 includes right and left side walls 40 and 50, respectively, and right and left roof sections 60 and 65, respectively.

Figure 3:
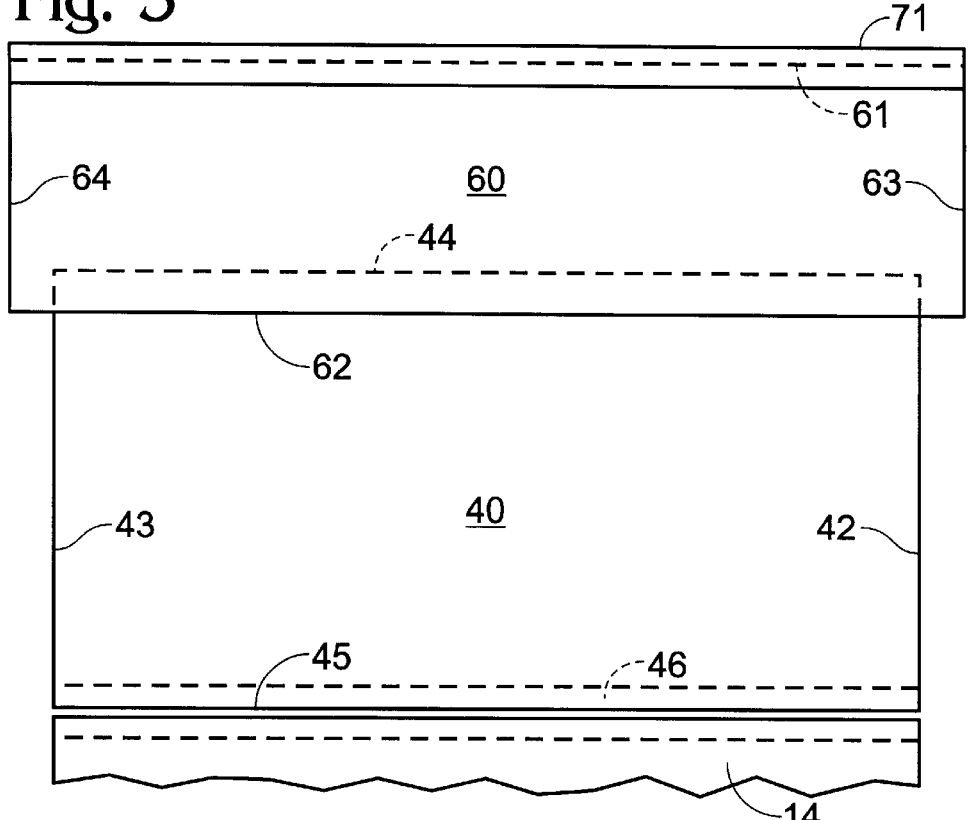
FIG. 3 is a right side elevation view of the house of the present invention.

As best seen in FIG. 3, right side wall 40 includes front and rear side edges 42 and 43, respectively, and top and bottom edges 44 and 45, respectively. Bottom edge 45 is attached to the top edge of flange 14 by means of hinge member 46. As best seen in FIG. 5, top edge 44 is attached to right roof section 60 by means of hinge member 47.

Figure 4:
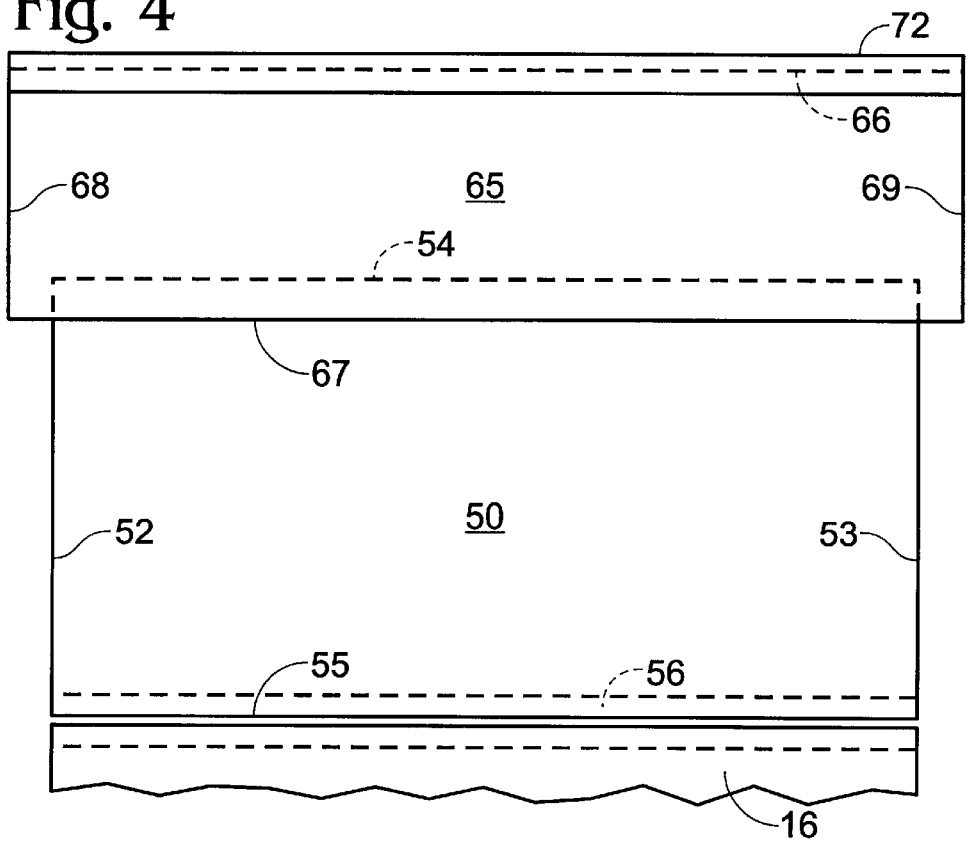
FIG. 4 is a left side elevation view of the house of the present invention.

As best seen in FIG. 4, left side wall 50 includes front and rear side edges 52 and 53, respectively, and top and bottom edges 54 and 55, respectively. Bottom edge 55 is attached to the top edge of flange 16 by means of hinge member 56. As best seen in FIG. 5, top edge 54 is attached to left roof section 62 by means of hinge member 57.

Right roof section 60 includes upper and lower longitudinal edges 61 and 62, respectively, and front and rear edges 63 and 64, respectively. A longitudinally extending channel 74, having an upper, lower and inner wall, extends inwardly from the upper inner surface of right roof section 60. Channel 74 is adapted to receive the upper end of left roof section 65, as best seen in FIG. 8.

Left roof section 65 includes upper and lower longitudinal edges 66 and 67, respectively, and front and rear edges 68 and 69, respectively.

The manner in which the upper longitudinal edges 61 and 66 of right and left roof sections 60 and 65, respectively, are joined and held in place involves roof ridge latch member 70 attached to the outer surface of the upper longitudinal edge 61 of right roof section 60.

Figure 8:
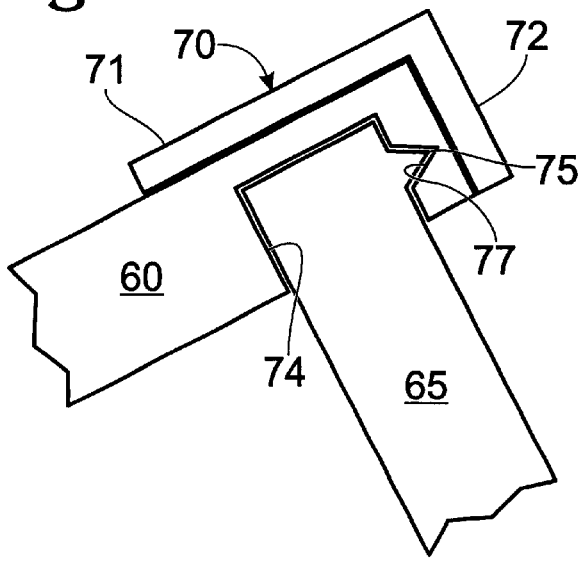
FIG. 8 is an enlarged front elevation of the roofing ridge locking mechanism.
Figure 9:
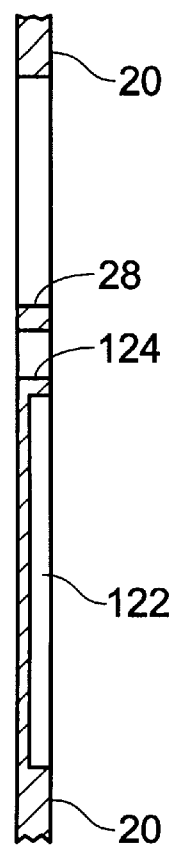
FIG. 9 is a partial sectional view of the front wall taken along line 9—9 of FIG. 1.
Figure 11:
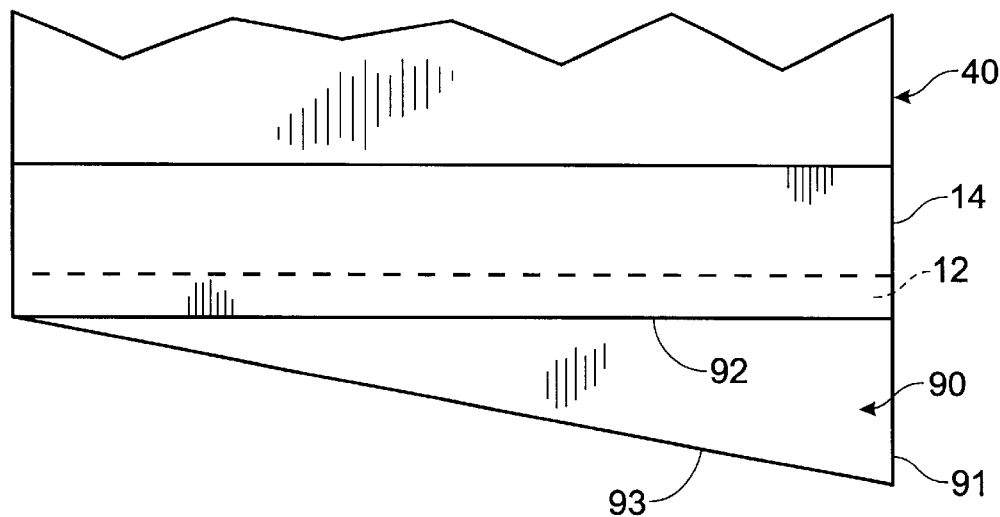
FIG. 11 is a right side elevation view of the house of the present invention showing the optional use of bracket members.
Figure 12:
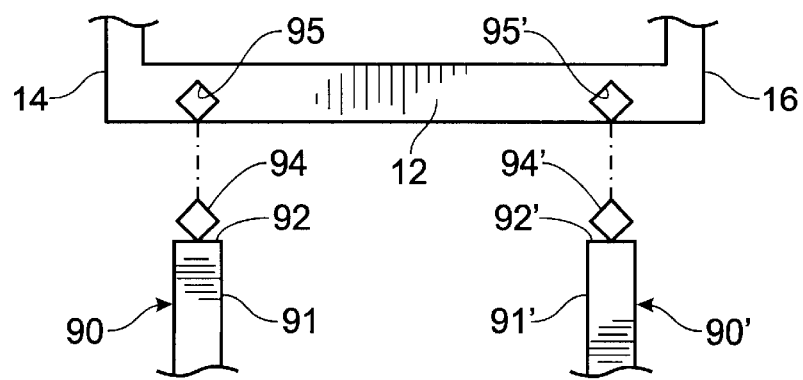
FIG. 12 is a partial front, exploded, elevation view showing the optional bracket members.

As best seen in FIG. 8, roof ridge latch member 70 includes an L-shaped member comprised of right leg 71 and left leg 72. Right leg 71 is attached to the upper longitudinal edge 61 of right roof section 60, as shown. Left leg 72 extends a short distance that is substantially equal to the thickness of right roof section 60.

A longitudinally extending latch ridge 75 extends outwardly from the upper surface of left roof section 65 adjacent the outer end thereof.

During assembly of house 10, the upper end of left roof section 65 is inserted into channel 74 of right roof section 60, and latch ridge 75 is seated in groove 77 of left roof section 65.

Figure 7:
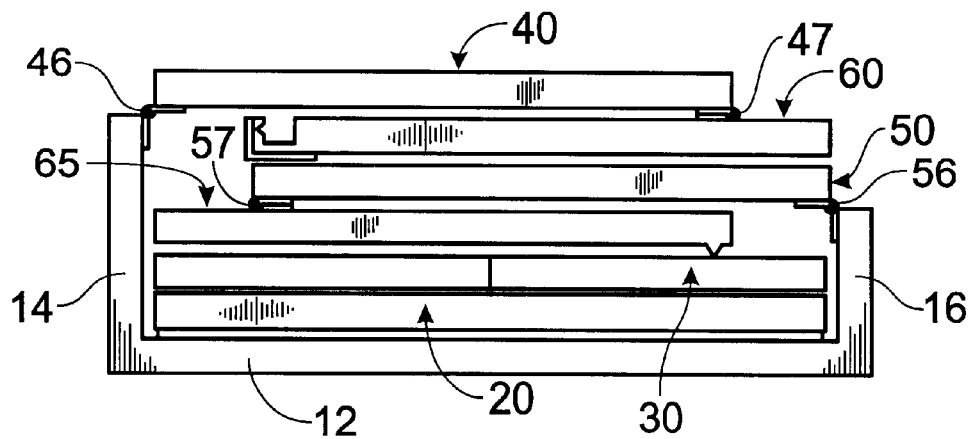
FIG. 7 is a front elevation view of the house of the present invention with the right wall/roof collapsed onto the left wall/roof.

FIGS. 1–4 show the house 10 in its fully erected position. FIGS. 5–7 show house 10 in various stages of collapse.

The first step in collapsing house 10 is to collapse front wall 20 inwardly and downwardly until its inner planar surface contacts the upper planar surface of bottom 12. Next, rear wall 30 is collapsed inwardly and downwardly until its inner planar surface contacts the outer planar surface of front wall 20, as seen in FIG. 5. Then left roof section 65 is collapsed downwardly into contact with left side wall 50, and left side wall 50 collapsed inwardly and downwardly, as seen in FIG. 6. Finally, right roof section 60 is collapsed downwardly into contact with side wall 40, and side wall 40 collapsed inwardly and downwardly, as seen in FIG. 7.

In its fully collapsed configuration seen in FIG. 7, the major planes of front and rear endwalls 20 and 30, right and left sidewalls 40 and 50, and right and left roof sections are substantially parallel with front endwall 20 laying over floor 12, rear wall 30 laying over front endwall 20, left roof section 62 laying over rear wall 30, left sidewall 50 laying over left roof section 62, right roof section 60 laying over left sidewall 50, and right sidewall 40 laying over right roof section 60.

As seen in FIG. 7, right sidewall foundation flange 14 has a height substantially the same as the aggregate thicknesses of front wall 20, rear wall 30, left roof section 62, left side wall 50 and right roof section 60. As also seen in FIG. 7, left sidewall foundation flange 16 has a height substantially the same as the aggregate thicknesses of front wall 20, rear wall 30 and left roof section 62. Rear endwall foundation flange 18 has a height substantially the same as the thickness of front endwall 20 to provide that the rear endwall 30 can be folded over front endwall 20 with their major planes being substantially parallel.

To assemble house 10, the steps described above would be reversed.

If the house 10 is to be used for birds, it would have a smaller size than if it were to be used as a dog house.

The material used to construct the house 10 may be any suitable material, such as cardboard, plywood, or a plastic board material (foamed or unfoamed).

The material selected for the various hinge members would be selected depending upon whether the house 10 is intended for disposable or permanent usage. For disposable usage, where cardboard or foamed plastic board could used for the various walls, roof, etc., the hinges could merely be tape, or paper or cloth adhered to adjacent parts by an adhesive. For a more permanent structure, where plywood or plastic panels are used for the various walls, roof, etc., the hinges could be of the piano hinge type formed of metal, or extruded plastic thin enough to be bendable and attached by adhesive or by use of fasteners. In all cases, the hinges are thin enough so as to not interfere with the collapse of house 10 into the compact package shown in FIG. 7.

Figure 10:
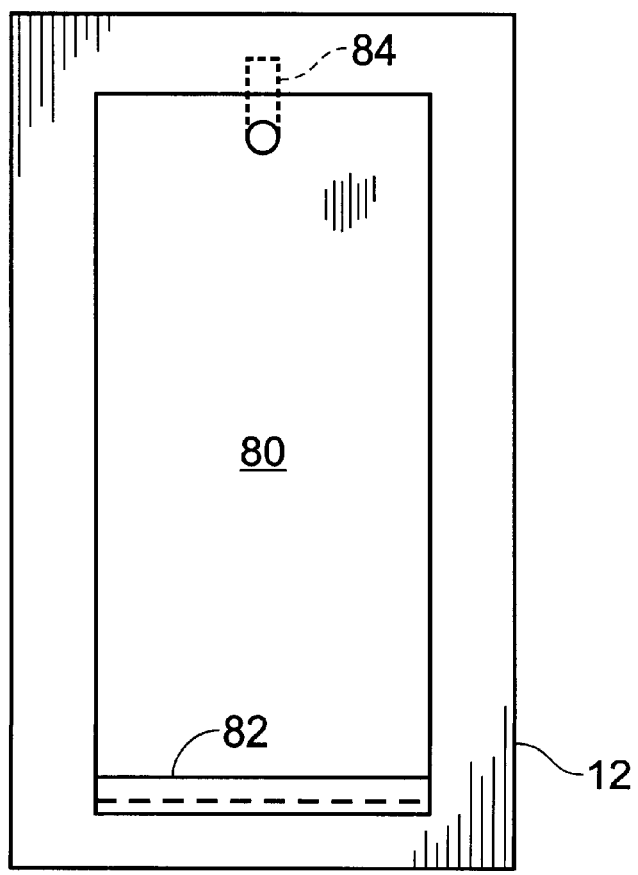
FIG. 10 is a plan view of an optional cleanout door located in the bottom of the house of the present invention.

One optional feature is a cleanout door 80 located in the floor 12, as best seen in FIG. 10. Cleanout door 80 fits into an opening in floor 12, as shown, and is pivotally attached at one end to floor 12 by hinge member 82. A latch member 84 is located at the other end of cleanout door 80.

A further optional feature for use when house 10 is used as a birdhouse are right and left brackets 90 and 90', respectively. Right and left brackets 90 and 90' have the configuration of a right triangle having base sides 91, 91', altitude sides 92, 92', and hypotenuse sides 93, 93', respectively. Railing members 94, 94' extend from altitude sides 92, 92', and are adapted to slide into longitudinal slots 95, 95' located in floor 12. Railing members 94, 94' and slots 95, 95' are illustrated as having a diamond cross-section; however, any suitable cross-section may be used. Suitable cross-bracing may extend between brackets 90 and 90', such as a web extending between base sides 91, 91'. Brackets 90, 90' are adapted to help hold house 10 against a building in conjunction with a hook or other fastener (not shown) extending from or into the rear wall 30.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A collapsible house for birds, etc., comprising:

a floor having right and left side edges, and front and rear edges;

opposing right and left sidewalls, each said sidewall having upper and lower longitudinal edges, and front and rear edges;

opposing front and rear endwalls, each of said endwalls having right and left vertical edges, a lower horizontal edge, and sloping upper edges that join at an apex to form front and rear gables;

said lower horizontal edge of said front endwall being pivotally attached to said floor, said front endwall having an entry opening therein adapted to permit ingress and egress of an occupant;

a right sidewall foundation flange extending upwardly from said right side edge of said floor and a left sidewall foundation flange extending upwardly from said left side edge of said floor, each of said sidewall foundation flanges having an upper longitudinal edge, said upper longitudinal edge of one of said right and left sidewall foundation flanges having a height above said floor greater than the upper longitudinal edge of the other sidewall foundation flange;

said right sidewall having a lower longitudinal edge pivotally attached to said upper longitudinal edge of said right sidewall foundation flange, said left sidewall having a lower longitudinal edge pivotally attached to said upper longitudinal edge of said left sidewall foundation flange;

a rear endwall foundation flange extending upwardly from said rear edge of said floor, said rear endwall foundation flange having an upper longitudinal edge;

said lower horizontal edge of said rear endwall being pivotally attached to the upper longitudinal edge of said rear endwall foundation flange;

right and left roof sections, each said roof section having upper and lower longitudinal edges and front and rear edges, said right roof section being pivotally attached adjacent its lower longitudinal edge to the upper longitudinal edge of said right sidewall, said left roof section being pivotally attached adjacent its lower longitudinal edge to the upper longitudinal edge of said left sidewall, said upper longitudinal edges of said right and left roof sections adapted to substantially abut each other to form a peak when said roof sections are in contact with said front and rear gables;

and means for connecting said right and left roof sections along said peak.

2. The house of claim 1 wherein said means for connecting said right and left roof sections includes a channel formed in the inner, upper end of one of said roof sections, said channel having an upper, lower and inner wall, said channel adapted to receive the upper end of the other of said roof sections, a latch groove extending inwardly from one of said upper or lower walls of said channel, and a latch ridge extending from one of the upper or lower surfaces of said other of said roof sections adjacent its outer end and adapted to engage said latch groove when the outer end of said other roof section is inserted into said channel.

3. The house of claim 1 including a cleanout door located in said floor.

4. The house of claim 1 including a perch removably held in place in a groove located in said front endwall, said front endwall having an opening located below said entry opening and adapted to receive said perch.

5. The house of claim 1 including left and right brackets removably attached to said floor.

* * * * *